Aug. 21, 1945. H. N. BAUMANN, JR ET AL 2,383,035
ALUMINOUS ABRASIVE MATERIAL
Filed Oct. 18, 1944

Henry N. Baumann Jr.
Charles E. Wooddell    INVENTORS.

BY  
ATTORNEY!

UNITED STATES PATENT OFFICE 2,383,035

ALUMINOUS ABRASIVE MATERIAL

Henry N. Baumann, Jr., and Charles E. Wooddell, Niagara Falls, N. Y., assignors to The Carborundum Company, Niagara Falls, N. Y., a corporation of Delaware Application October 18, 1944, Serial No. 559,200

6 Claims. (Cl. 51—309)

This application relates to granular abrasive material and in particular to new, artificially made aluminous abrasive having physical characteristics that result in new and distinctive grinding properties.

Aluminous abrasives such as corundum and emery have long been known, as naturally occurring minerals; and artificially made forms of aluminous abrasives have been in use for some time. In general, these artificial aluminous abrasives are made by fusing minerals high in aluminum such as bauxite in an electrical arc-type furnace. A considerable amount of the impurities in the raw material is removed in the furnace by reduction. In some cases the bauxite is first refined chemically so that most of the metallic elements other than aluminum are removed, making available for electric furnace fusion a raw product containing chiefly alumina ($Al_2O_3$).

These abrasive materials, both natural and artificial, are, crystallographically, chiefly crystalline alumina in the alpha alumina form. They differ somewhat in porosity, crystal size, and in their intergranular and included impurities but the individual crystals are always anhedral, that is, with no development of normal crystal faces. These crystals are more or less closely packed, approximately equidimensional and oriented heterogeneously.

The new abrasive material of the present invention differs from all previously made aluminous abrasive material in that each crystal of it has a peculiar regular microstructure that may be described as "feathery." This "feathery" microstructure is characterized by the presence of substantially parallel columns of alpha alumina microcrystals oriented lengthwise in the direction of the C-axis of the crystals and bounded with approximately parallel planes of matrix material which generally appears in microsections as parallel lines.

Two examples of this "feathery" microstructure are illustrated in Figures 1 and 2. The photomicrographs in both figures were taken with plane polarized light and crossed Nicols at a magnification of about 30 diameters.

Figure 1:
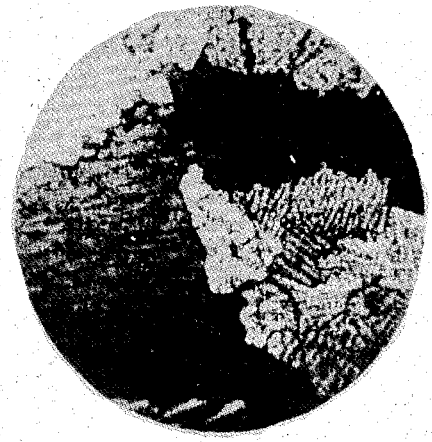
Figure 1 illustrates the structure of a fused aluminous material made in accordance with the present invention and containing a few per cent of zircon.
Figure 2:
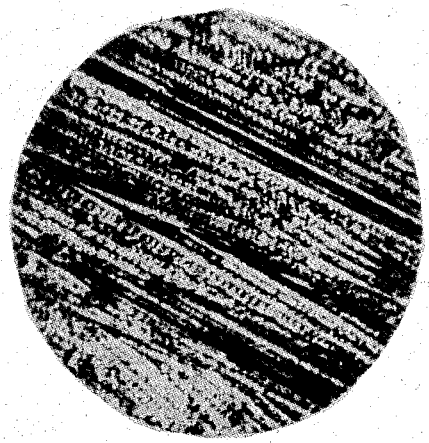
Figure 2 illustrates the structure of a fused aluminous material made in accordance with the present invention and having, instead of zircon, a few per cent of beryl.

In examining these photomicrographs it will be observed that Figure 1 shows a number of cross-sections of large crystals while Figure 2 shows only a portion of the cross-section of one such crystal. However, as would be revealed by greater magnification, each individual crystal in Figure 1 has the general microstructure shown in Figure 2.

While in carrying out the present invention the composition of the fused aluminous mass is vital, it is also essential that certain manufacturing procedure be followed in production of the new abrasive material. While other types of furnaces can be used, it is preferably made by fusion in an electric furnace of the type now commercially used for manufacturing the common varieties of fused alumina abrasive. After the material is fused the furnace is tilted and the fused mass is poured into a mold which may be built up of carbon or graphite slabs or may be a heavy, water cooled sheet metal pan. The thickness of the poured material is fairly critical, the desired structure being only obtained when the thickness is between 1½ inches and 6 inches. If thicker sections are poured, the rate of cooling and consequently the rate of crystallization is so retarded that instead of obtaining the desired microstructure the resultant block or slab contains a considerable amount of material that resembles ordinary fused alumina abrasive material.

The material illustrated in Figure 1 contains alumina as its principal constituent (90 per cent or more) and about 3 per cent zircon which is the principal constituent of the matrix for the alpha alumina micro-crystals. On crushing this material, which is extremely tough, it breaks up into more or less blocky granules with a generally cubical shape. The material illustrated in Figure 2 contains 90 per cent or more of alumina and a matrix which consists principally of about 5 per cent beryl. This material also is extremely tough but when crushed it breaks up into granules with a generally tetrahedral shape. Both the cubic and tetrahedral granules have an abundance of sharp corners and edges which make them useful as abrasives.

One of the most important characteristics of an aluminous abrasive is its toughness. This characteristic may be measured by mounting single granules between parallel, hard, plane surfaces and applying pressure slowly until the granule crushes or collapses.

In Table I is given a comparison of the toughness (expressed as pounds pressure required to crush 16 grit granules) of aluminous abrasives similar to those discussed above. Types 1 and 2 are ordinary standard commercial alumina abrasives while types 3 and 4 are examples of abrasive material according to the present invention.

Table I

| Type of aluminous material | Force required to crush granule |
|---|---|
| | Pounds |
| (1) 99+% fused alumina | 28 |
| (2) Ordinary 90-98% fused alumina | 26.5 |
| (3) Fusion of (3% zircon+97% of No. 2) cast into 4 inch thick blocks | 41 |
| (4) Fusion of (5% beryl+95% of No. 2) cast into 2 inch thick blocks | 41.5 |

The toughness of abrasives can, in general, be increased by roasting them, a desirable temperature for roasting being 1200° C. for compositions like those above. However, the materials of types (3) and (4) still show superiority to the materials of types (1) and (2) after all the materials have been given a roasting treatment.

While because of their convenience and cheapness it is preferred to use the minerals zircon and beryl as matrix forming materials in the manufacture of the improved aluminous abrasive materials, 3% to 10% by weight of these minerals being found suitable for the production of abrasive material having the novel "feathery" structure above described, it is possible and sometimes convenient to use the oxides forming these minerals instead of the minerals themselves. Thus zirconia and silica may be used together instead of zircon, and beryllia and silica may be used together instead of beryl, the small amount of alumina present in the beryl being supplied by the alumina of the fusion. At least enough of the oxides, that is, silica and zirconia or beryllia, must be used as would if combined amount to substantially 3% by weight of zircon or beryl. Of this 3% the zirconia and/or beryllia should amount to 0.016 mole, the remainder being silica.

Small amounts of impurities such as titania and iron oxides which are commonly associated with the sources of alumina and matrix materials used are not detrimental to the formation of the novel abrasive material of the present application. However, the presence of oxides that form aluminates, particularly those, such as magnesia, which form spinels, is in general undesirable. It should be remembered that in carrying out the invention the proper adjustment of the rate of cooling of the material tapped or poured from the crucible is essential.

From the above description and illustrations a person skilled in the manufacture of aluminous abrasives will understand the more important characteristics of the improved abrasive material and the method of its manufacture. It should be understood, however, that it is not intended that the invention should be limited by the examples given, but it is to be given a broad construction and limited only by the appended claims.

We claim:

1. Aluminous abrasive material comprising by chemical analysis at least 90% of crystalline aluminum oxide, and a matrix consisting principally of a silicate of the group consisting of beryl and zircon, each crystal of said material having a micro-structure characterized by approximately parallel planes of matrix material bounding parallel columns, oriented lengthwise in the direction of the C-axis of the crystal, of micro-crystals of alpha alumina.

2. Aluminous abrasive material comprising by chemical analysis at least 90% of crystalline aluminum oxide, and a matrix consisting principally of beryl, each crystal of said material having a micro-structure characterized by approximately parallel planes of matrix material bounding parallel columns, oriented lengthwise in the direction of the C-axis of the crystal, of micro-crystals of alpha alumina.

3. Aluminous abrasive material comprising by chemical analysis at least 90% of crystalline aluminum oxide, and a matrix consisting principally of zircon, each crystal of said material having a micro-structure characterized by approximately parallel planes of matrix material bounding parallel columns, oriented lengthwise in the direction of the C-axis of the crystal, of micro-crystals of alpha alumina.

4. Aluminous abrasive material comprising by chemical analysis at least 90% of crystalline aluminum oxide together with a total of at least 3% of silica and a metallic oxide of the group consisting of beryllia and zirconia, said total of 3% containing 0.016 moles of said metallic oxide, the remainder being silica; each crystal of said material having a micro-structure characterized by approximately parallel planes of matrix material which consists principally of the reaction product of silica and said metallic oxide bounding parallel columns, oriented lengthwise in the direction of the C-axis of the crystal, of micro-crystals of alpha alumina.

5. Aluminous abrasive material comprising by chemical analysis at least 90% of crystalline aluminum oxide together with a total of at least 3% of silica and beryllia, said total of 3% containing 0.016 mole of beryllia, the remainder being silica; each crystal of said material having a micro-structure characterized by approximately parallel planes of matrix material which consists principally of the reaction product of silica and beryllia bounding parallel columns, oriented lengthwise in the direction of the C-axis of the crystal, of micro-crystals of alpha alumina.

6. Aluminous abrasive material comprising by chemical analysis at least 90% of crystalline aluminum oxide together with a total of at least 3% of silica and zirconia, said total of 3% containing 0.016 mole of zirconia, the remainder being silica; each crystal of said material having a micro-structure characterized by approximately parallel planes of matrix material which consists principally of the reaction product of silica and zirconia bounding parallel columns, oriented lengthwise in in the direction of the C-axis of the crystal, of micro-crystals of alpha alumina.

HENRY N. BAUMANN, Jr.
CHARLES E. WOODDELL.